(12) United States Patent
Delcher et al.

(10) Patent No.: US 12,504,036 B2
(45) Date of Patent: Dec. 23, 2025

(54) FRICTION SPACER

(71) Applicant: Centre Technique des Industries Mécaniques, Senlis (FR)

(72) Inventors: Christophe Delcher, Unieux (FR); Martin Jay, Bonson (FR)

(73) Assignee: Centre Technique des Industries Mécaniques (FR)

( * ) Notice: Subject to any disclaimer, the term of this patent is extended or adjusted under 35 U.S.C. 154(b) by 172 days.

(21) Appl. No.: 18/248,828

(22) PCT Filed: Oct. 14, 2021

(86) PCT No.: PCT/FR2021/051788
§ 371 (c)(1),
(2) Date: Apr. 12, 2023

(87) PCT Pub. No.: WO2022/079392
PCT Pub. Date: Apr. 21, 2022

(65) Prior Publication Data
US 2023/0400052 A1   Dec. 14, 2023

(30) Foreign Application Priority Data
Oct. 14, 2020   (FR) ........................................ 2010484

(51) Int. Cl.
*F16B 43/00* (2006.01)
*F16B 39/24* (2006.01)

(52) U.S. Cl.
CPC .................................... *F16B 43/00* (2013.01)

(58) Field of Classification Search
CPC ........... F16B 43/00; F16B 2/005; F16B 39/24
(Continued)

(56) References Cited

U.S. PATENT DOCUMENTS 2,441,188 A * 5/1948 Earhart .................. F16B 2/005
                                                                403/404
3,761,867 A * 9/1973 Churla ................. H01R 4/2479
                                                                411/957

(Continued)

FOREIGN PATENT DOCUMENTS

DE        10001857 A1    7/2001
FR         2966533 A1    4/2012
(Continued)

OTHER PUBLICATIONS

International Search Report mailed Feb. 3, 2022 in corresponding PCT International Application No. PCT/FR2021/051788.
(Continued)

*Primary Examiner* — Flemming Saether
(74) *Attorney, Agent, or Firm* — OSTROLENK FABER LLP

(57) ABSTRACT

A friction spacer adapted to be interposed between two mechanical components in order to transfer a force between the two mechanical components, the friction spacer including a flat part having two opposite surfaces defining a thickness, and a plurality of protuberances projecting from at least one of the surfaces, the protuberances of the plurality of protuberances extending from the at least one of the opposite surfaces by a determined average height. The flat part and the protuberances are produced from the same metal material, and the same metal material continuously extends between the flat part and the protuberances.

14 Claims, 3 Drawing Sheets

(58) Field of Classification Search
USPC .......................................... 411/531, 160–162
See application file for complete search history.

(56) References Cited

U.S. PATENT DOCUMENTS

| | | | | |
|---|---|---|---|---|
| 3,828,515 | A * | 8/1974 | Galgoczy | F16B 5/02 403/279 |
| 3,856,424 | A * | 12/1974 | Beck, Jr. | F16B 43/00 403/408.1 |
| 6,082,942 | A * | 7/2000 | Swick | H01R 4/304 411/533 |
| 6,223,110 | B1 | 4/2001 | Rowe et al. | |
| 6,347,905 | B1 | 2/2002 | Lukschandel | |
| 8,070,404 | B1 | 12/2011 | Schluter | |
| 8,425,169 | B2 * | 4/2013 | Burtsche | F16B 39/24 411/257 |
| 8,492,004 | B2 * | 7/2013 | Watanabe | F16B 43/00 428/609 |
| 9,500,220 | B2 | 11/2016 | Wiley et al. | |
| 11,920,625 | B2 * | 3/2024 | Cattaneo | F16B 39/282 |
| 2003/0039527 | A1 | 2/2003 | Schatz | |
| 2013/0170922 | A1 * | 7/2013 | Persson | C25D 5/36 470/42 |
| 2016/0025145 | A1 * | 1/2016 | Kobayashi | F16D 69/02 411/160 |
| 2022/0243353 | A1 * | 8/2022 | Daub | C25D 15/00 |

FOREIGN PATENT DOCUMENTS

| | | |
|---|---|---|
| FR | 3072690 A1 | 4/2019 |
| JP | H 11247231 A | 9/1999 |
| JP | H 11247831 A | 9/1999 |
| JP | 2013-530352 A | 7/2013 |
| WO | WO 2011/133090 A1 | 10/2011 |
| WO | WO 2014/181373 A1 | 11/2014 |

OTHER PUBLICATIONS

Written Opinion mailed Feb. 3, 2022 in corresponding PCT International Application No. PCT/FR2021/051788.
Japanese Office Action, dated Sep. 2, 2025, issued in corresponding Japanese Application No. 2023-523137.

* cited by examiner

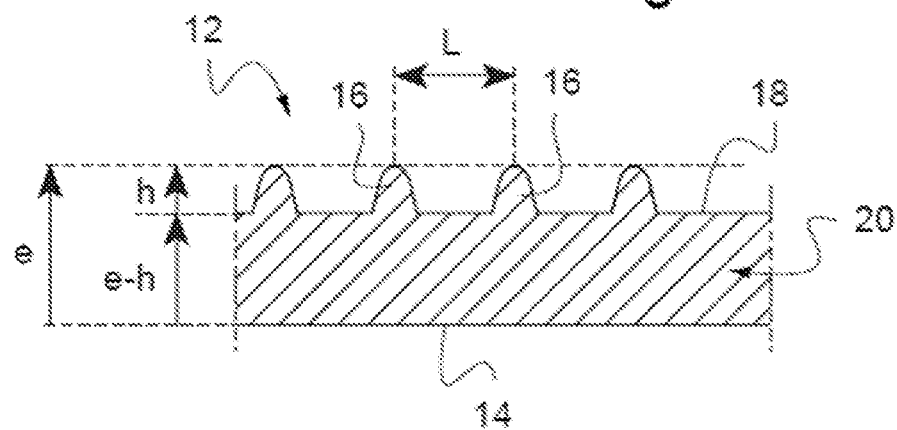
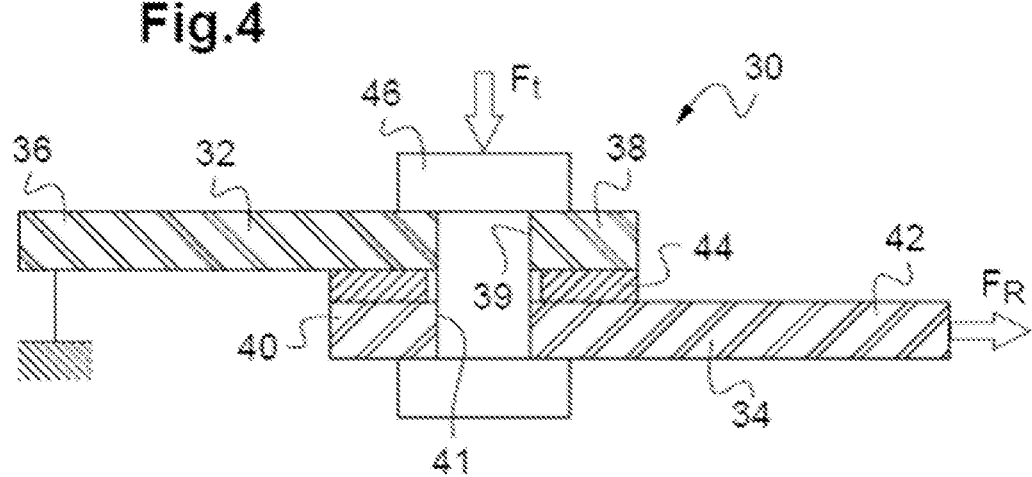

FRICTION SPACER

CROSS-REFERENCE TO RELATED APPLICATIONS

The present application is a 35 U.S.C. §§ 371 national stage application of International Application No. PCT/FR2021/051788, filed Oct. 14, 2021, which claims priority to French Patent Application No. 2010484, filed Oct. 14, 2020, the contents of which are incorporated herein by reference.

FIELD OF INVENTION

The present invention relates to a friction spacer adapted to be interposed between two mechanical components in order to be able to prevent their relative movement.

BACKGROUND

It is common to intend holding two parts forcibly bearing against each other by means of screw clamping components in order to be able to hold them in a fixed position and so that they could resist forces aimed at driving them in movement relative to each other. This resistance to the relative movement of the two parts relative to each other is the product of the clamping force of the two parts against each other by the adhesion coefficient at the interface between the two parts.

Also, it is known to insert friction spacers between two parts so that they could better resist their relative movement, or else in order to be able to reduce the clamping forces which tend to generate mechanical stresses on the parts. Thus, these friction spacers have an adhesion coefficient with the parts, much higher than that between the parts.

Friction spacers better known as clamping washers or friction washers are made of a steel sheet in an annular shape, which is covered on each of its faces with diamond particles embedded in a layer of nickel.

Reference may be made to the document U.S. Pat. No. 6,347,905 B1, which describes such spacers.

The diamond particles project from the washer and they then fit into the surface of the parts when the spacers are clamped between these parts. Indeed, diamond is the material whose hardness culminates on Mohs scale. In this manner, the adhesion coefficients, or static friction coefficients, at the interface between the spacers and the parts are considerably increased.

Such spacers are relatively complex to make since it is necessary to implement at least three materials, steel, nickel and diamond particles. Moreover, the diamond particles have different shapes with an average equivalent diameter in the range of one micrometre and they are randomly scattered over the surface of the spacers. Thus, the uneven distribution of these particles with unequal shapes and dimensions at the surface of the spacers induces local variations in the static friction coefficient. What is more, the quality of the blocking of the two parts together depends on the quality of the connection between the diamond particles and the metal materials, steel and nickel.

SUMMARY

Also, a problem that arises and which the present invention aims to solve is to provide a friction spacer that is simpler to make and whose surface mechanical properties are more homogeneous.

For this purpose, according to a first aspect, a friction spacer is provided adapted to be interposed between two mechanical components so as to be able to transfer a force between said two mechanical components, said friction spacer comprising a flat part having two opposite surfaces defining a thickness, and a plurality of protuberances projecting from at least one of said surfaces, the protuberances of said plurality of protuberances extending from said at least one of said opposite surfaces by a determined average height. Said flat part and said protuberances are made of the same metal material, and said same metal material continuously extends between said flat part and said protuberances. And the ratio of said determined average height of said protuberances and the sum of said thickness of said flat part and of said determined average height of said protuberances, is comprised between one half and one tenth, whereas said determined average height of said protuberances is preferably comprised between 30 µm and 500 µm.

Thus, one feature of the invention lies in the implementation of a friction spacer whose body in the form of a flat part and the protuberances that project therefrom, are made of the same material without any material discontinuity between the flat part and protuberances. As will be explained in more detail in the remainder of the description, such features are obtained starting from a blank flat part at the surface of which each of the protuberances is trimmed. In this manner, the flat part and the protuberances form a single part.

Thus, the metal material of the protuberances continuously extends into the flat part. And consequently, the connection between the protuberances and the flat part is much better than that of the diamond particles and the annular steel sheet according to the prior art. Furthermore, and as will be explained hereinafter, such a spacer is simpler to make.

One should observe that the metal components have planar bearing surfaces against which the friction spacer according to the invention is flat applied. For example, one amongst the metal components has a bearing surface into which an orifice opens, whereas the other bearing component consists of the underside of a screw head. The friction spacer is then annular and it is clamped between the bearing surface and the screw head, the screw having a rod which then passes through the friction spacer and is fitted into the orifice, and the bearing surface of the mechanical component.

Also, thanks to the ratio of the heights, the cohesion of the protuberances and of the flat part is sufficient and it avoids detachment thereof when stresses are exerted on the spacer.

Furthermore, thanks to the height of the protuberances, comprised between 30 µm and 500 µm, the spacers are suited to be implemented on any type of bearing surface.

The height of these protuberances may be predetermined according to the type of mechanical component to be assembled. Thus, for example, on bearing surfaces including a paint-type coating, friction spacers whose protuberances have a length close to 300 µm are implemented. On the other hand, on bare bearing surfaces made of relatively hard steel, for example, friction spacers having protuberances whose length is close to 50 µm are implemented.

According to a particularly advantageous embodiment of the invention, said ratio is comprised between one third and one sixth, which further improves cohesion. In this manner, and given the determined average height of the protuberances, the spacers have a maximum thickness of 3 mm and a minimum thickness of 90 μm. In this manner, such spacers can be installed on pre-designed screw assemblies, without having to re-size them.

Also, and according to a preferred embodiment, said protuberances are evenly distributed over said at least one of said surfaces. In other words, the protuberances are spaced apart from each other by a constant pitch. In this manner, the protuberances are homogeneously distributed over the surface of the flat part and thus ensure constant surface local properties. What is more, and as will be explained hereinafter, the protuberances have the same geometry, which further improves the homogeneity of the surface local properties. Consequently, the protuberances extend from the surface by the same height, with very little dispersion. In other words, given the aforementioned very low dispersion, the protuberances have a height comprised between 30 μm and 500 μm.

Thanks to these features, it should be understood that the spacer fitted between two mechanical components compressed one against the other, according to a uniform contact pressure, generates the same indentation of the protuberances in the parts over the entire surface of the spacer. Henceforth, the adhesion coefficient will be homogeneous over its entire surface.

According to another embodiment, the protuberances are distributed over said at least one of said surfaces according to a progressive pitch. In this manner, and in particular when the contact pressure is not uniform, it is possible to maintain a substantially homogeneous adhesion coefficient over the entire contact surface.

Furthermore, and according to still another embodiment, the protuberances have a progressive geometry over said at least one of said surfaces. In other words, the protuberances are for example increasingly prominent, according to the same direction at the surface.

Advantageously, the protuberances have both a progressive geometry, and are spaced apart from each other by a progressive pitch, over said at least one of said surfaces.

Moreover, said flat part preferably has two pluralities of extended protuberances respectively projecting from said two opposite surfaces. In this manner, when the friction spacer is fitted between the two mechanical components, the protuberances of the two opposite surfaces are brought to cooperate in an identical manner with the two mechanical components.

Also, and according to a particularly advantageous variant, said plurality of protuberances comprises between 500 and 5,000 protuberances per $cm^2$ of said at least one of said surfaces. For example, when the bearing surfaces have a coating, a spacer having protuberances with a length close to the upper limit, close to 300 μm and a number of protuberances per $cm^2$ close to the lower limit, for example 600 protuberances per $cm^2$, is selected.

Furthermore, and according to a particularly advantageous variant, said plurality of protuberances comprises between 2,000 and 5,000 protuberances per $cm^2$ of said at least one of said surfaces. In this manner, an optimum indentation of the protuberances in the mechanical components is obtained. When the density of the protuberances is off the aforementioned limits, the static friction coefficient decreases substantially. This is particularly verified when the bearing surfaces are uncoated.

Furthermore, thanks to the height of the protuberances and given the ratio of the aforementioned determined average height of said protuberances and the sum of said thickness of said flat part and of said determined average height of said protuberances, relatively thin friction spacers are obtained. As will be explained hereinafter, such a thickness is advantageous and enables implementation independently of the original dimensioning of the screwed assemblies.

Moreover, the metal material implemented to make the friction spacers is preferably steel. Nonetheless, other metal materials may be implemented.

Furthermore, and according to another implementation of the invention, the protuberances are coated with another metal material, for example chromium nitride. Such a coating allows increasing the hardness of the protuberances.

According to a second aspect in accordance with the invention, a method for manufacturing a friction spacer as described hereinabove is provided. Such a friction method comprises the following steps: a blank flat part having two opposite blank faces is provided, and each of said protuberances is trimmed in at least one of said blank faces to form said plurality of protuberances. Thus, starting from a blank flat part having two opposite blank faces, at least one of the faces is machined so as to trim each of the protuberances. In other words, metal material is removed around each of the protuberances so that these appear afterwards projecting from the surface thus cleared.

Different machining tools may be used to remove the material and carry out this trimming. For example, a femtosecond laser may be implemented.

A femtosecond laser allows trimming with great precision, a large number of protuberances per unit area. Henceforth, this type of laser allows shaping conical protuberances with a polygonal directrix curve. For example, it allows making conical protuberances with a square or rectangular base. In other words, the protuberances have a pyramid-like shape. Such protuberances have an advantage thanks to their pointed end. Indeed, the protuberances thus penetrate more effectively and deeply into the material of the surface against which the friction spacer is compressed. Henceforth, the resistance to friction is further improved.

BRIEF DESCRIPTION OF THE FIGURES

Other features and advantages of the invention will become apparent upon reading the description made hereinafter of particular embodiments of the invention, given for indication and without limitation, with reference to the appended drawings wherein:

FIG. 3 is a schematic sectional view according to the plane III-III represented in [FIG. 2]; and, FIG. 4 is a schematic view of the implementation of the object of the invention.

DETAILED DESCRIPTION

Figure 1:
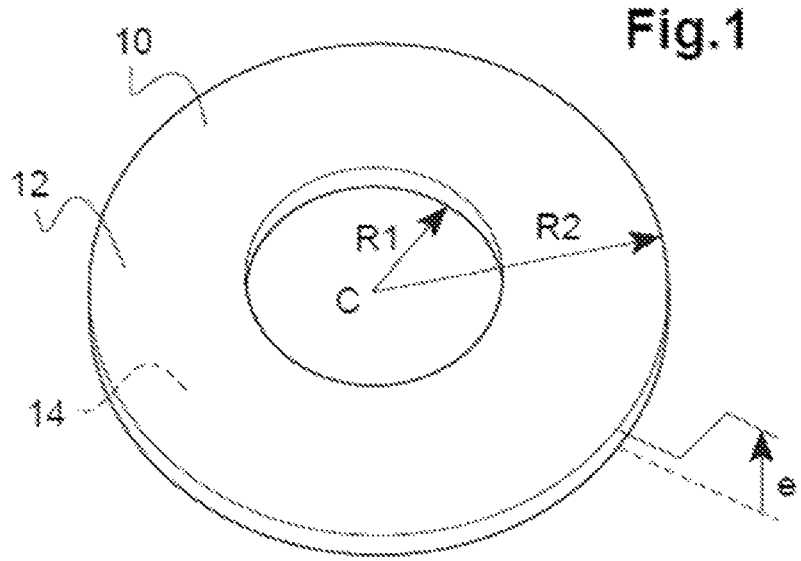
FIG. 1 is a schematic perspective top view of a blank allowing making the friction spacer according to the invention.

FIG. 1 shows, viewed from above, a blank flat annular part 10 of steel, forming a blank. It has two opposite faces 12, 14. The illustrated blank flat annular part 10 has a centre C. Its inner diameter R1 is 2 mm, whereas its outer radius is 6 mm. Also, its thickness e is 0.3 mm namely 300 μm.

Thus, in accordance with an object of the invention, the face 12 of the blank annular part 10 is machined to form a plurality of protuberances as will be described hereinafter. And in this manner, a friction spacer in accordance with the invention is obtained.

According to a first variant, a femtosecond laser is implemented, which by definition produces ultra-short pulses in the range of 10-15 seconds, perfectly suited for micro-machining.

Thanks to the femtosecond laser, driven by a robot which is controlled by a control installation according to a pre-defined program, one of the faces 12 of the annular part 10 is thus machined in order to be able to trim therein protuberances with a height substantially equal to 75 μm and with a diameter, at the base, of substantially 50 μm, according to a first variant.

Figure 2:
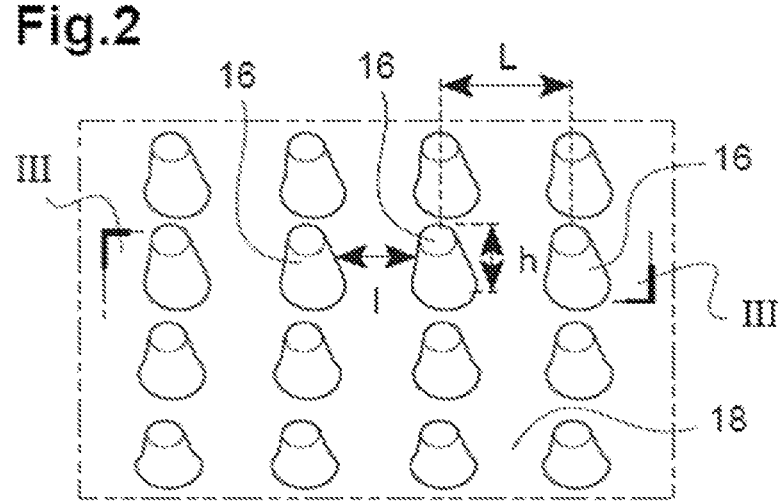
FIG. 2 is a high magnification schematic view of the surface of the object of FIG. 1 after transformation.
Figure 5:
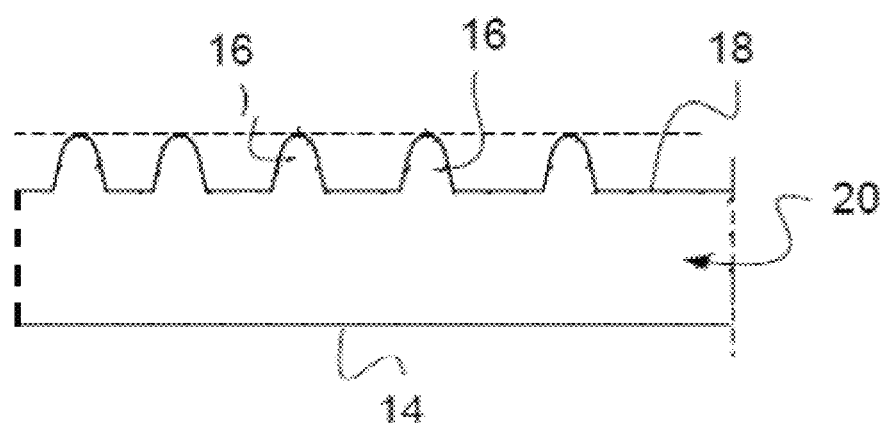
FIG. 5 is a sectional view showing progressive reduction of density of protuberances in the radial direction.

Thus, as illustrated in detail in [FIG. 2], partially showing a portion of the surface 12 of about 0.6 mm$^2$ with high magnification, protuberances 16 of said plurality of protuberances, forming substantially frustoconical studs, extend according to a square pattern over the mean plane of the friction spacer. In other words, the protuberances 16 extend according to two directions perpendicular to each other, and spaced apart from each other by the same distance according to both directions. As illustrated in [FIG. 2], all of the protuberances 16 of the plurality of protuberances formed on the face 12 have substantially the same shape and the same dimension.

Also, the protuberances 16 extend over a height h of substantially 75 μm from a surface 18. They are spaced apart from each other by a distance L of substantially 150 μm and the space I that separates them two-by-two is substantially equal to 100 μm, according to this first variant. Also, their diameter at the base, namely at the surface 18, is substantially equal to 50 μm.

Given these dimensions, a number of protuberances 16 per square centimetre of surface 18 in the range of 4,450 is obtained.

Henceforth, referring now to [FIG. 3], illustrating partially in cross-section according to the plane III-III as represented in [FIG. 2], the friction spacer then obtained after micro-machining includes a flat part 20 and the protuberances 16 which project from the surface 18 of the flat part 20. The ratio between the height h of the protuberances 16 and the thickness e of the spacer is then measured. Thus, the height h of the protuberances 16 of 75 μm is to be related to the thickness e of the blank flat annular part 10, but also to the distance that extends from the face 14 opposite to the machined face 12, up to the top of the protuberances 16 and which is 300 μm. In the example disclosed herein, this ratio amounts to one quarter, in other words, 0.25.

Furthermore, given the micro-machining where it consisted in removing material, namely steel, the material continuously extends between said flat part 20 and the protuberances 16. In this manner, the material of the flat part extends into the protuberances 16 without discontinuity and without metallurgical disturbance. Henceforth, the protuberances 16 are firmly connected to the flat part 20.

Also, the steel used for the blank flat annular part 10 is relatively hard and with a hardness greater than 380 HV according to Vickers hardness measurement.

Furthermore, micro-machining by means of the femtosecond laser does not affect the metallurgy of the remaining steel, and consequently, it preserves its hardness. In other words, the protuberances 16 in particular, which project from the surface 18, keep this hardness higher than 380 HV. Such a feature is particularly advantageous as will be explained in more detail hereinafter.

According to a second variant, the protuberances 16 also extend over a height of 75 μm from the surface. But they are spaced apart from each other by a distance of 200 μm and the space that separates them two-by-two is then 150 μm taking into account their diameter of 50 μm. Henceforth, a number of protuberances of 2,500 per square centimetre of surface is obtained.

According to two third variants, the protuberances extend over a height of 100 μm, with a distribution over the surface similar to that of the first variant for a first third variant, and with a distribution similar to that of the second variant for a second third variant.

Still according to said first variant, where a femtosecond laser is implemented, the other face 14 opposite to the face 12 of the object of [FIG. 1] is also machined. In this manner, protuberances are trimmed on this other face 14 having identical geometry and distribution, for example according to either one of the three aforementioned variants.

According to a second variant of the invention, a precision electrochemical machining process is implemented to form the protuberances on the surface of the blank flat annular part.

To do so, cells are first made in the working surface of a circular tool. The working surface is planar and annular shaped. Its dimensions are substantially equal to those of the blank flat annular part as represented in [FIG. 1].

Thus, cells are formed on the working surface. These cells are frustoconical and they have a depth substantially larger than 75 μm. Their circumference, at the working surface, is substantially larger than 50 μm. The cells extend according to two directions perpendicular to each other and they are spaced apart by the same distance according to both directions, namely 150 μm. In this manner, a cell density of about 4,450 cells per square centimetre is obtained.

Afterwards, a blank flat annular part of the aforementioned type is adjusted opposite the working surface of the circular tool and the blank flat annular part and the circular tool are electrically coupled. Then, the circular tool and the annular part are driven in translation according to a sinusoidal movement towards each other by applying a potential difference between the two, whereas an electrolyte is circulated therein. In this manner, the metal of the surface of the blank flat annular part, except opposite the cells, is caused to dissolve. Thus, over the course of the process cycle, protuberances appear having a shape and a density of about 4,450 per square centimetre, quite similar to the protuberances formed according to the aforementioned first variant and in accordance with the first variant.

According to this second variant, protuberances of the same metallurgical nature as the flat part from which they project are also obtained.

Also, thanks to this method, the protuberances are formed at the surface of the flat part at an advantageous cost, in particular when producing in large series.

Of course, according to this second variant of the invention, it is possible to obtain the desired density of protuberances over the surface of the flat part with the desired dimensions in terms of height and diameter, by forming corresponding cells in the working surface of the tool.

What is more, the flat part is turned over to be able to machine the other face according to the same process.

Regardless of the retained variant of the invention, a circular friction spacer is obtained, advantageously having two opposite surfaces provided with protuberances.

Also, regardless of the variant of the invention, and according to a particular embodiment, on a blank flat annular part, protuberances with close geometry and dimension are formed along radii of said part. What is more, these protuberances extend along the same radius, spaced radially apart with a progressive pitch from the centre outwards. In this manner, the density of the protuberances progressively decreases from the centre outwards.

According to another embodiment, on a blank flat annular part, protuberances are formed along radii, whose pitch is constant and whose dimensions are progressive.

Moreover, according to a particularly advantageous implementation, the flat part provided with the protuberances is treated to further increase their hardness. Thus, a layer of a ceramic coating with a thickness comprised between 0.15 μm and 15 μm for example is hot-deposited over the surface and the protuberances of the flat part. For example, a chromium nitride layer is deposited.

Furthermore, the friction spacer according to the invention is not limited in terms of size or shape to a flat annular part as described hereinabove.

One should also observe that the friction spacer according to the invention is relatively thin. Henceforth, one could decide to implement it for the needs of a bolted assembly without having to re-size the elements of this assembly in a new design. In other words, a screwed assembly that would already be implemented, but which over time would tend to unscrew, could then receive a friction spacer in accordance with the invention without calling into question neither the elements of the assembly nor their function in terms of effort.

A procedure for testing the circular friction spacers obtained according to the invention will now be described with reference to [FIG. 4]. This procedure implements a measuring device 30. The latter includes an assembly comprising herein two metal plates, an upper one 32, and a lower one 34. The upper plate 32 has an anchoring end 36 and a first opposite end 38 pierced with an orifice 39. The lower plate 34 includes a second end 40 pierced with another orifice 41 and an opposite traction end 42.

A friction spacer in accordance with the invention 44 to be tested is interposed between the two ends 38, 40, whereas an adjustable clamping component 46 is fitted through the orifices 39, 41 and through the friction spacer 44. In this manner, a given axial tension Ft is exerted thanks to the clamping component 46 to compress the two ends 38, 40 on either side of the friction spacer 44 to be tested. Afterwards, the force Fr to be exerted on the traction end 42 of the lower plate 34 according to a direction perpendicular to the axial tension Ft, to cause the relative movement of the two plates 32, 34 relative to each other, is reported. A static friction coefficient $\mu_0$ is then deduced therefrom.

Also, with the friction spacer according to the invention, a static friction coefficient $\mu_0$ higher than 0.3 is reported. This result is advantageous compared to the usual static friction coefficient $\mu_0$, steel against steel, which is in the range of 0.2.

Also, in other comparative tests, a tensile force is not tested, but rather a rotational force, namely a torque. To do so, an attempt is made to drive the two plates 32, 34 in rotation relative to each other about the axis of the clamping component 46. And then the rotational torque to be exerted to cause the relative movement of the two plates 32, 34 is reported.

Moreover, and according to yet another variant of the invention, not represented herein, protuberances having a pyramid shape are implemented. They have the advantage of improving their indentation in the material of the bearing surface. In this manner, the resistance to friction is increased.

Advantageously, such a configuration of protuberances may be made directly by means of a femtosecond laser.

The invention claimed is:

1. A friction spacer adapted to be interposed between two mechanical components in order to be able to transfer a force between said two mechanical components, said friction spacer comprising a flat part having two opposite surfaces defining a thickness, and a plurality of protuberances projecting from at least one of said surfaces, said plurality of protuberances extending from said at least one of said surfaces by a determined average height, said flat part and said protuberances being made of the same metal material, whereas said same metal material continuously extends between said flat part and said protuberances;
   wherein the ratio of said determined average height of said protuberances and the sum of said thickness of said flat part and of said determined average height of said protuberances, is comprised between one half and one tenth,
   said determined average height of said protuberances is comprised between 30 μm and 500 μm, and
   the protuberances are aligned radially with a pitch therebetween.

2. The friction spacer according to claim 1, wherein said ratio is comprised between one third and one sixth.

3. The friction spacer according to claim 1, wherein said protuberances are evenly distributed over said at least one of said surfaces.

4. The friction spacer according to claim 1, wherein said flat part has two pluralities of extended protuberances respectively projecting from said two opposite surfaces.

5. The friction spacer according to claim 1, wherein said plurality of protuberances comprises between 500 and 5,000 protuberances per $cm^2$ of said at least one of said surfaces.

6. The friction spacer according to claim 5, wherein said plurality of protuberances comprises between 2,000 and 5,000 protuberances per $cm^2$ of said at least one of said surfaces.

7. The friction spacer according to claim 1, wherein said metal material is steel.

8. The friction spacer according to claim 1, wherein said protuberances are coated with another metal material.

9. The friction spacer according to claim 8, wherein said other metal material is chromium nitride.

10. A method for manufacturing a friction spacer according to claim 1, wherein a blank flat part is provided having two opposite blank faces, and in that each of said protuberances is trimmed in at least one of said blank faces to form said plurality of protuberances.

11. The friction spacer according to claim 1, wherein the pitch between the protuberances is progressive so that a density of the protuberances progressively decreases.

12. The friction spacer according to claim 1, wherein the pitch between the protuberances is progressive so that a density of the protuberances progressively decreases starting from a center of the spacer.

13. The friction spacer according to claim 1, wherein the pitch between the protuberances is constant.

14. The friction spacer according to claim 13, wherein dimensions of the protuberances are progressive.

* * * * *